US009562623B2

(12) United States Patent
Clark et al.

(10) Patent No.: US 9,562,623 B2
(45) Date of Patent: Feb. 7, 2017

(54) POSITION INDICATOR FOR VALVES

(71) Applicant: Mueller International, LLC, Atlanta, GA (US)

(72) Inventors: Kenneth A. Clark, Chattanooga, TN (US); Jared Aaron Brandt, Hixson, TN (US); Ralph William Vanderburg, Soddy Daisy, TN (US)

(73) Assignee: Mueller International, LLC, Atlanta, GA (US)

( * ) Notice: Subject to any disclaimer, the term of this patent is extended or adjusted under 35 U.S.C. 154(b) by 191 days.

(21) Appl. No.: 13/902,092

(22) Filed: May 24, 2013

(65) Prior Publication Data
US 2013/0314239 A1 Nov. 28, 2013

Related U.S. Application Data

(60) Provisional application No. 61/651,962, filed on May 25, 2012.

(51) Int. Cl.
*F16K 37/00* (2006.01)
*E03B 7/08* (2006.01)
*G08B 21/18* (2006.01)

(52) U.S. Cl.
CPC .............. *F16K 37/0041* (2013.01); *E03B 7/08* (2013.01); *F16K 37/0033* (2013.01); *G08B 21/18* (2013.01)

(58) Field of Classification Search
CPC ......... F16K 37/00; F16K 37/08; F16K 37/008
USPC .................................................. 137/553, 554
See application file for complete search history.

(56) References Cited

U.S. PATENT DOCUMENTS

| 951,927 | A | 3/1910 | Whitney |
|---|---|---|---|
| 1,784,094 | A | 12/1930 | Fletcher |
| 2,768,604 | A | 10/1956 | Enerud |
| 3,297,050 | A | 1/1967 | Rider |
| 3,592,042 | A | 7/1971 | Martinex |
| 3,804,056 | A | 4/1974 | Lee |
| 4,133,288 | A | 1/1979 | Burgess |
| 4,338,723 | A | 7/1982 | Benjamin |
| 4,361,308 | A | 11/1982 | Buss |

(Continued)

FOREIGN PATENT DOCUMENTS

| AU | 2013266093 | 9/2016 |
|---|---|---|
| CN | 102426448 | 4/2012 |

(Continued)

OTHER PUBLICATIONS

Clarke, Kenneth; International Preliminary Report on Patentability for serial No. PCT/US13/42704, filed May 24, 2013, mailed Dec. 4, 2014, 7 pgs.

(Continued)

*Primary Examiner* — Craig Schneider
*Assistant Examiner* — Daniel P Donegan
(74) *Attorney, Agent, or Firm* — Taylor English Duma LLP

(57) ABSTRACT

A device for indicating the status of a valve includes a position indicator, wherein the position indicator includes a monitoring element, and a communication element. A method for indicating the status of at least one valve includes monitoring positions of a device enclosed by a first valve with a position indicator and communicating the positions of the device enclosed by the first valve with a communications element.

20 Claims, 14 Drawing Sheets

(56) References Cited

U.S. PATENT DOCUMENTS

| | | | |
|---|---|---|---|
| 4,627,497 A * | 12/1986 | Byrne | F16K 37/00 137/553 |
| 4,635,901 A | 1/1987 | Pond | |
| 4,722,372 A | 2/1988 | Hoffman | |
| 4,768,548 A | 9/1988 | Maurer | |
| 4,926,903 A | 5/1990 | Kawai | |
| RE33,649 E | 7/1991 | Kawai | |
| 5,623,963 A * | 4/1997 | Stommes et al. | 137/554 |
| 5,647,396 A * | 7/1997 | Stommes et al. | 137/554 |
| 5,906,222 A * | 5/1999 | Faulstich | 137/554 |
| 6,079,442 A | 6/2000 | Raymond, Jr. | |
| 6,182,690 B1 * | 2/2001 | Robert | 137/554 |
| 6,308,723 B1 * | 10/2001 | Louis et al. | 137/1 |
| 6,422,532 B1 | 7/2002 | Garner | |
| 6,633,157 B1 * | 10/2003 | Yamaki et al. | 324/207.2 |
| 6,670,806 B2 * | 12/2003 | Wendt et al. | 324/207.24 |
| 7,044,444 B2 * | 5/2006 | Haubold et al. | 251/279 |
| 7,156,121 B2 * | 1/2007 | Cox et al. | 137/554 |
| 7,609,056 B2 * | 10/2009 | Junk et al. | 324/207.25 |
| 7,934,518 B2 * | 5/2011 | Rho et al. | 137/554 |
| 8,430,123 B2 * | 4/2013 | Kleegrewe | 137/554 |
| 8,813,778 B2 * | 8/2014 | Bachmann et al. | 137/554 |
| 2001/0011809 A1 | 8/2001 | Fukuda | |
| 2002/0144979 A1 | 10/2002 | Fedocak | |
| 2003/0116742 A1 * | 6/2003 | Anderson | F16K 31/508 251/326 |
| 2004/0134665 A1 | 7/2004 | Greeb | |
| 2004/0221896 A1 * | 11/2004 | Ballenger et al. | 137/554 |
| 2005/0011556 A1 * | 1/2005 | Dudzik et al. | 137/554 |
| 2005/0155650 A1 | 7/2005 | McMurtrey | |
| 2008/0087334 A1 * | 4/2008 | Reilly | F16K 37/0041 137/554 |
| 2008/0092960 A1 * | 4/2008 | Manecke et al. | 137/554 |
| 2008/0202608 A1 * | 8/2008 | Tschida et al. | 137/554 |
| 2008/0308157 A1 * | 12/2008 | Zhuang et al. | 137/12 |
| 2009/0322359 A1 | 12/2009 | Rho et al. | |
| 2010/0084029 A1 * | 4/2010 | Lin et al. | 137/553 |
| 2010/0116365 A1 * | 5/2010 | McCarty | 137/554 |
| 2010/0294373 A1 * | 11/2010 | Haller et al. | 137/1 |
| 2011/0057131 A1 * | 3/2011 | Bachmann et al. | 251/65 |
| 2011/0094595 A1 * | 4/2011 | Schottler | 137/12 |
| 2011/0203685 A1 * | 8/2011 | Lin et al. | 137/553 |
| 2011/0290332 A1 * | 12/2011 | Soldo et al. | 137/15.01 |
| 2011/0308638 A1 * | 12/2011 | Hyland | E03B 9/06 137/299 |
| 2013/0206258 A1 * | 8/2013 | Duboy et al. | 137/553 |
| 2013/0314239 A1 | 11/2013 | Clark et al. | |
| 2015/0101693 A1 | 4/2015 | Enomoto | |

FOREIGN PATENT DOCUMENTS

| | | |
|---|---|---|
| WO | 8905938 | 6/1989 |
| WO | 2008042122 | 4/2008 |
| WO | 2009090197 | 7/2009 |
| WO | 2011134855 | 11/2011 |

OTHER PUBLICATIONS

Clark, Kenneth A.; U.S. Provisional Patent Application Entitled: Position Indicator for Valves; U.S. Appl. No. 61/651,962, filed May 25, 2012; 30 pgs.

Clarke, Kenneth; PCT Application entitled: Position Indicator for Valves, having serial No. PCT/US13/42704, filed May 24, 2013, 31 pgs.

Clarke, Kenneth; International Search Report and Written Opinion for serial No. PCT/US13/42704, filed May 24, 2013, mailed Oct. 16, 2013, 9 pgs.

Clark, Kenneth A.; Written Opinion for Singapore serial No. 11201407214R, filed May 24, 2013, mailed May 15, 2015, 7 pgs.

Clark, Kenneth A.; Examination Report for Singapore application No. 11201407214R, filed May 24, 2013, mailed Jan. 8, 2016, 5 pgs.

Clark, Kenneth A.; Australian Examination Report for serial No. 2013266093, filed May 24, 2013, mailed Feb. 12, 2016, 3 pgs.

Clark, Kenneth A., U.S. Divisional Patent Application entitled: Position Indicator for Valves having U.S. Appl. No. 14/919,772, filed Oct. 22, 2015, 32 pgs.

Clark, Kenneth A.; Extended European Search Report for serial No. EP13794174.6, filed May 24, 2013, mailed Dec. 21, 2015, 9 pgs.

Clark, Kenneth A.; Mexico Office Action for serial No. MX/a/2014/014153, filed May 24, 2013, mailed Mar. 28, 2016, 5 pgs.

Clark, Kenneth A.; Non-Final Office Action for U.S. Appl. No. 14/919,772, filed Oct. 22, 2015, mailed Sep. 27, 2016, 26 pgs.

* cited by examiner

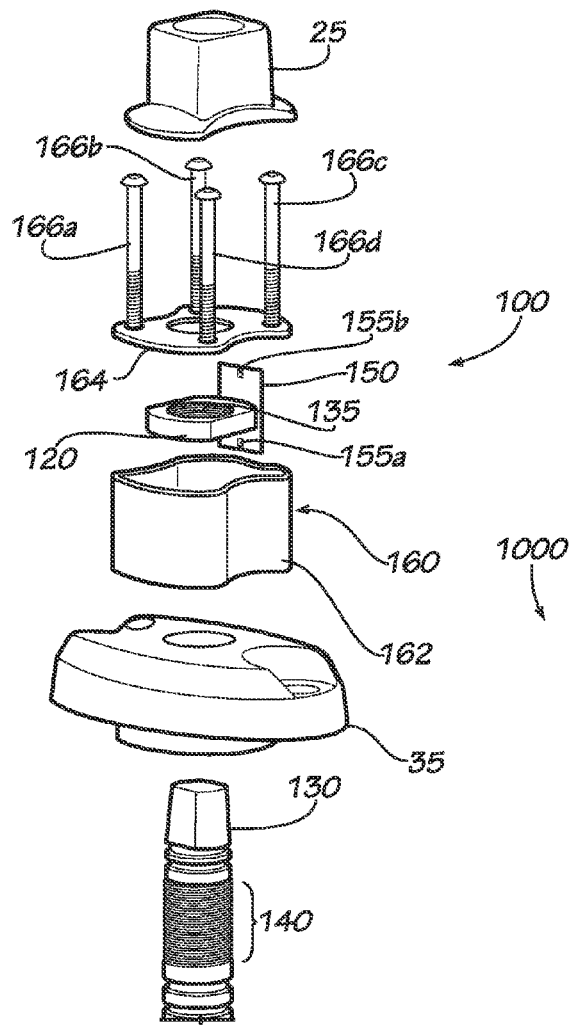
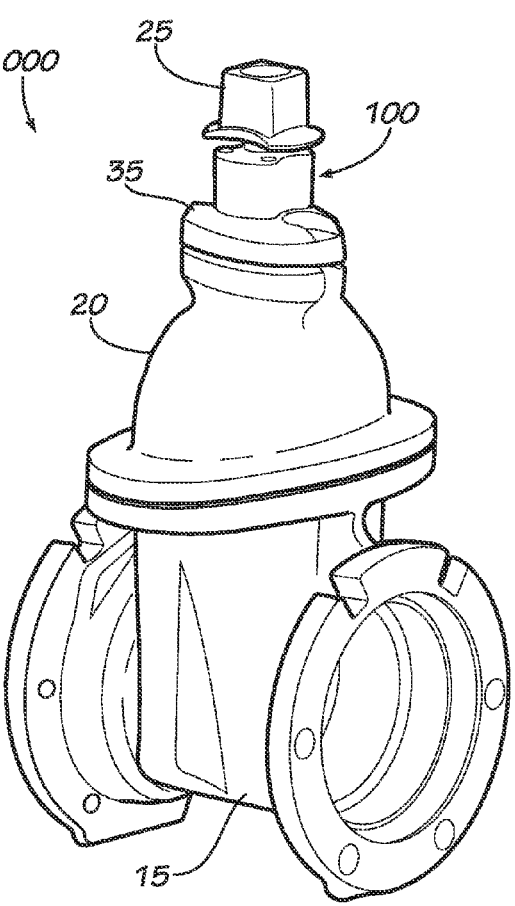
FIG. 3
FIG. 4

POSITION INDICATOR FOR VALVES

REFERENCE TO RELATED APPLICATIONS

This application claims priority to U.S. Provisional Application No. 61/651,962, filed May 25, 2012, which is hereby specifically incorporated by reference herein in its entireties.

FIELD

This disclosure relates to valves. More specifically, this disclosure relates to position indicators for valves.

SUMMARY

Disclosed is a device for indicating the status of a valve including a position indicator, wherein the position indicator includes a monitoring element, and a communication element.

Also disclosed is a method for indicating the status of at least one valve including monitoring positions of a device enclosed by a first valve with a position indicator and communicating the positions of the device enclosed by the first valve with a communications element.

Various implementations described in the present disclosure may include additional systems, methods, features, and advantages, which may not necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BACKGROUND

Non-rising stem gate valves, butterfly valves, ball valves and similar types of valves may be operated by a number of different processes, including manual and electronic actuation. For example, non-rising stem gate valves provide a means to isolate and to stop flow in a piping system by rotating an internal threaded stem that moves the gate into proper alignment, i.e. to an open or closed position. Likewise, a butterfly valve rotates an internal disk that allows or prevents the flow of water through the valve. However, it can be difficult to determine whether a non-rising stem gate valve, a butterfly valve or similarly constructed valves are open or closed simply by viewing it from the outside.

DESCRIPTION OF THE FIGURES

The features and components of the following figures are illustrated to emphasize the general principles of the present disclosure and are not necessarily drawn to scale. Corresponding features and components throughout the figures may be designated by matching reference characters for the sake of consistency and clarity.

FIG. 3 is an exploded perspective view of a position indicator in accord with one embodiment of the current disclosure.

FIG. 4 is a perspective view of a non-rising stem gate valve incorporating the position indicator of FIG. 3 in accord with one embodiment of the disclosure.

DETAILED DESCRIPTION

Disclosed are methods, systems, devices, and various apparatus related to position indicators for various valves. Although this disclosure is presented mainly in the context of a non-rising stem gate valve interacting with water, the methods, systems, devices, and various apparatus disclosed herein may be used with any type of valve and any type of material where determining the status of the valve is difficult. The position indicator includes at least one monitoring element and at least one communication element. The position indicator is adapted to monitor, detect and communicate (locally or remotely) the status of the valve. It would be understood by one of skill in the art that the disclosed position indicator is described in but a few exemplary embodiments among many. No particular terminology or description should be considered limiting on the disclosure or the scope of any claims issuing therefrom.

Figure 1:
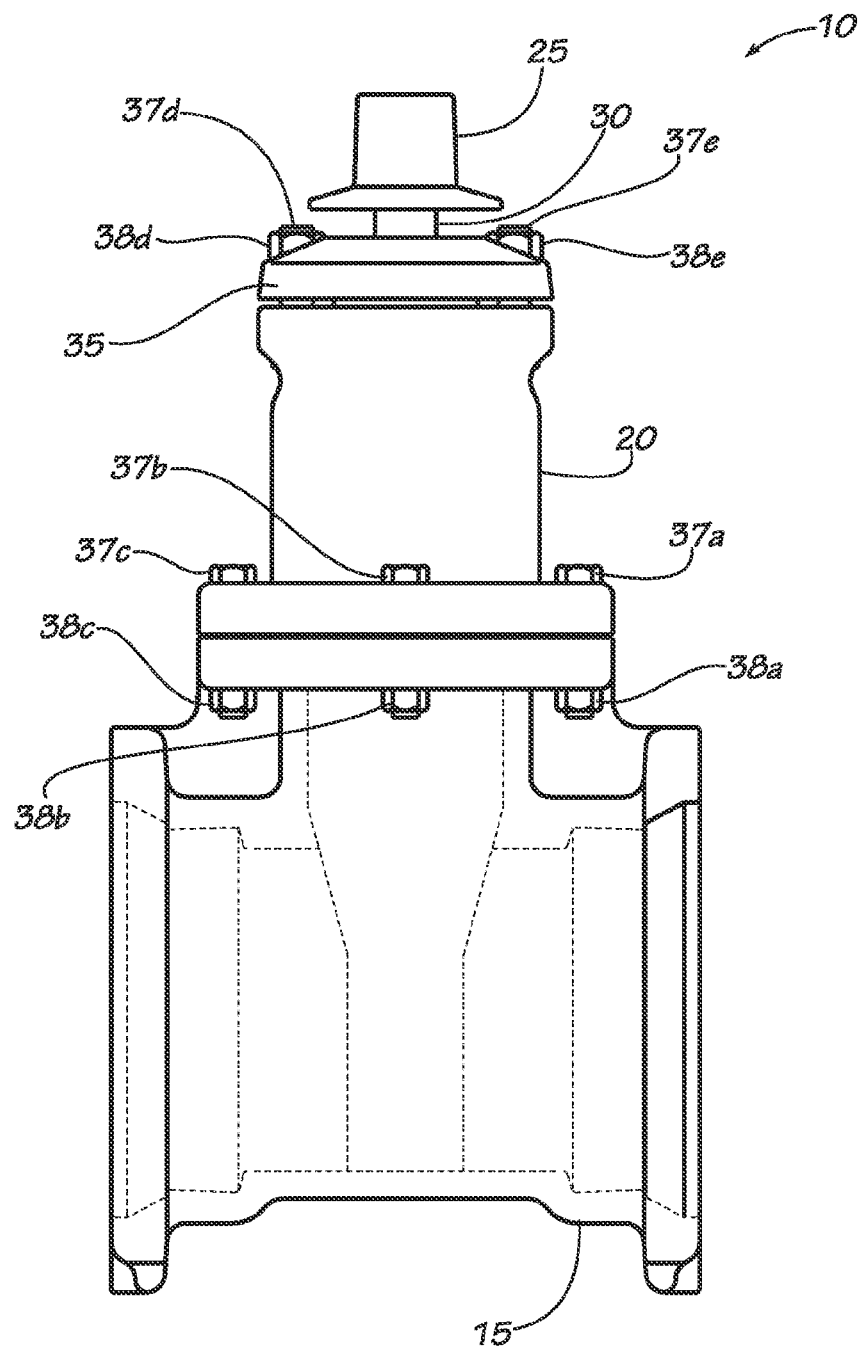
FIG. 1 is a side view of a non-rising stem gate valve.

In municipal piping systems, non-rising stem gate valves selectively prevent or allow flow of fluid through particular portions of the systems. As illustrated in FIG. 1, a typical non-rising stem gate valve 10 includes a housing 15, a bonnet 20, and an op nut 25. The op nut 25 is coupled to a stem 30. A stuffing box 35 is connected to the top of the bonnet 20. Bolts 37a,b,c and nuts 38a,b,c fasten the bonnet 20 onto the housing 15. Bolts 37d,e and nuts 38d,e connect the stuffing box 35 to the bonnet 20.

Figure 2:
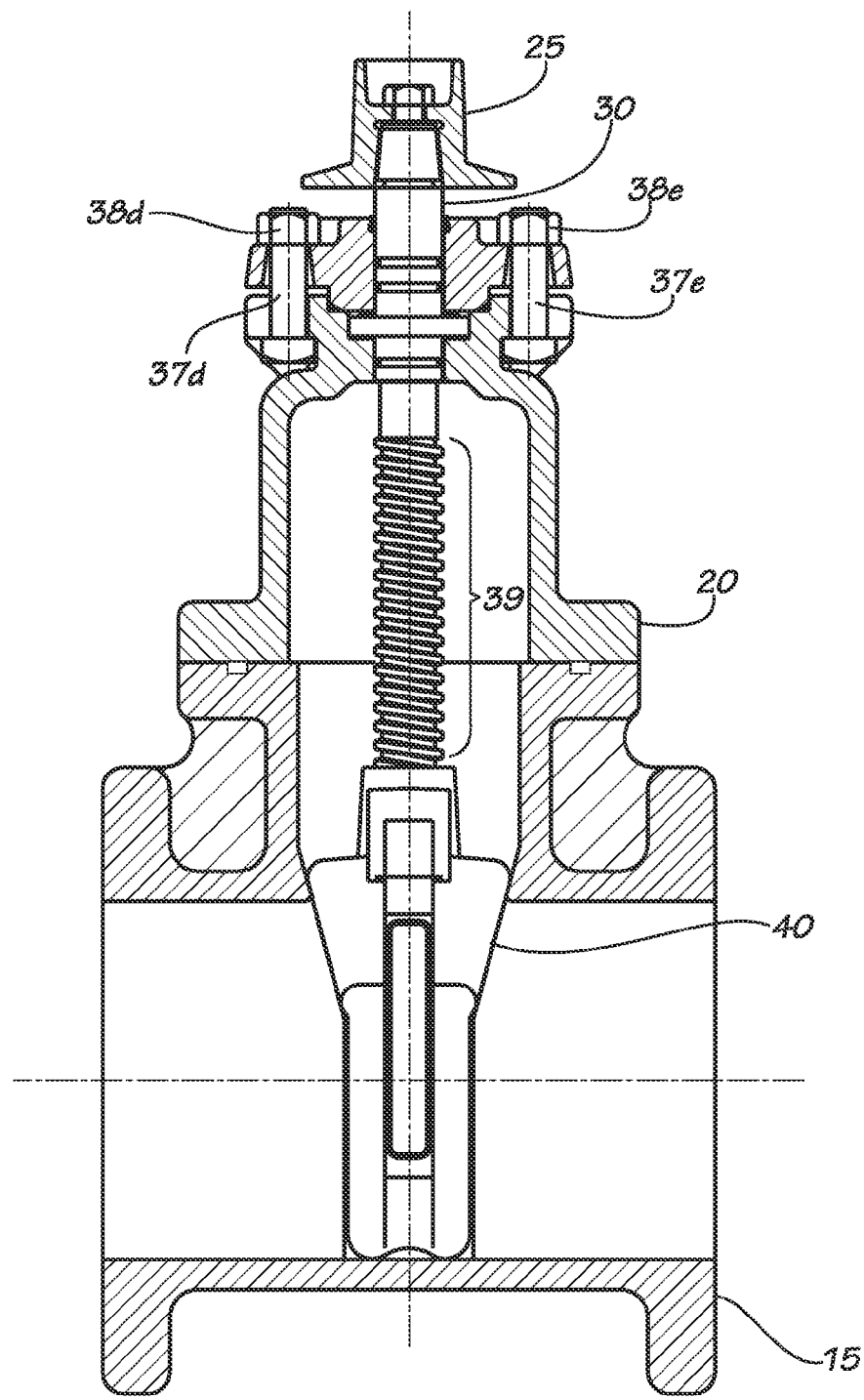
FIG. 2 is a cross-sectional view of the non-rising stem gate valve of FIG. 1.

As illustrated in cross-sectional view in FIG. 2, the stem 30 includes threading 39 to engage a gate 40 and to cause the gate 40 to rise out of or to descend into the path of the fluid flowing in the housing 15. The stem 30 is a non-rising stem, meaning it is not coupled to the housing 15 or the bonnet 20 in a way that would cause it to rise or fall with the motion of the gate 40. Although motion of the stem 30 may be restricted by the housing 15 or the bonnet 20, the threading 39 of the stem 30 is not mechanically connected to the housing 15 or the bonnet 20, so the stem 30 does not move upward or downward with the gate 40. Instead, the threads 39 of the stem 30 interact with threads (not shown) in the gate 40 to cause translational motion of the gate 40 from an open state (not shown)—in which fluid is allowed to flow through the gate valve 10—to a closed state (shown in FIG. 2)—in which fluid is blocked from flowing through the gate valve 10—and vice versa.

From the outside, however, it is difficult to determine whether the valve 10 is in the open state or the closed state or somewhere between. This can also cause problems from a systems perspective if the valve is connected to an electronic nodal network or utility mesh network, and the network is unable to determine the state of the valve 10.

The current disclosure includes methods, systems, and apparatus capable of determining a state of a non-rising stem gate valve and may include communication with a remote communicator. Various embodiments disclosed herein are exemplary embodiments meant to satisfy applicable statutory requirements. The embodiments disclosed herein should not be considered limiting on the disclosure.

As illustrated in FIGS. 3 and 4, one embodiment of a position indicator 100 and a non-rising stem gate valve 1000 is disclosed herein. The non-rising stem gate valve 1000 includes the same op nut 25, bonnet 20, stuffing box 35, housing 15, and gate 40 (not shown in FIGS. 3 and 4) as the non-rising stem gate valve 10 as previously described. However, the non-rising stem gate valve 1000 includes the position indicator 100 as an additional component. Although some components are coincident between the non-rising stem gate valve 1000 in the current embodiment and the non-rising stem gate valve 10 as previously described, the use of such components is for convenience only and is merely exemplary, and one of skill in the art would understand that no specific configuration or components will limit the scope of the disclosure.

The position indicator 100 is connected to the gate valve 1000 and monitors the motion of the stem. A magnet 110 (shown in FIGS. 5A and 5B) is connected to a position couple 120 that is coupled to a stem 130. In the current embodiment, the position couple 120 is a threaded collar. In the current embodiment, the magnet 110 is embedded within the position couple 120. In various embodiments, one or more magnets 110 may be placed within or on the position couple 120 in various arrangements. In other embodiments the position couple 120 may include magnetic material in its construction and thereby perform as a magnet, removing the need of a separate magnet 110. In some embodiments, the position couple 120 is coupled to the gate 40 or rests on the gate 40 to track the motion of the gate 40 directly. In some embodiments, the position indicator 100 may include at least one proximity sensor to determine proximity (relative to the proximity sensor) of the position couple 120 and magnet 110 and, thereby, the gate 40 that indicates their positions within the gate valve 1000. The magnet 110 follows the travel of the position couple 120 and, thereby, the movement of the stem 130 and gate 40. Particularly, in the current embodiment, the position couple 120 includes fine threads 135 which interact with fine threads 140 of the stem 130. Rotational movement of the stem 130 causes the translational movement of the gate 40 and the position couple 120 and, thereby, the magnet 110. The translational movement of the gate 40 corresponds to translational motion of the magnet 110, although the correspondence is dependent upon the pitch of the fine threads 140 with respect to the pitch of the magnet threads 39 (not shown in FIG. 3)

As illustrated in FIG. 3, the stem 130 of the current embodiment includes fine threads 140 that interact with the position couple 120. The position couple 120 of the current embodiment screws onto the stem 130 in proximity to a circuit board 150 that includes at least one proximity sensor which, in the current embodiment is two Hall sensors 155a,b. The circuit board 150 of the current embodiment may be replaced by similar mechanisms or materials for supporting or providing circuitry and other electrical components and connections. The circuit board 150 is positioned in an electronic case enclosure 160. The Hall sensors 155a,b can be seen on a side of the circuit board 150 proximate the position couple 120 and magnet 110 in the current embodiment, although various configurations may be used in various embodiments. In various embodiments, various sensor types may be used. One of skill in the art would understand that the proximity sensing of the current embodiment—utilizing Hall sensors 155a,b and the magnet 110—may be replaced by various proximity sensing techniques, including light sensing, audible sensing or SONAR, fluid viscosity, pressure devices, springs, rotational motion sensing, linear variable differential transformers ("LVDT"), various methods incorporating the above concepts with software, or various other methods. The electronic case enclosure 160 of the current embodiment includes a bottom 162 and a top 164. The top 164 is attached to the bottom 162 with mounting bolts 166a,b,c,d, although various fasteners may be used in various embodiments. The position indicator 100 assembly of the current embodiment is shown along with the stuffing box 35, which is the standard stuffing box 35 as previously shown. As seen in FIG. 4, the electronic case enclosure can be seen proximate the top end of the non-rising stem gate valve 1000, but the gate valve 1000 otherwise appears visually similar to the traditional non-rising stem gate valve such as non-rising stem gate valve 10, as shown above.

Figure 5A:
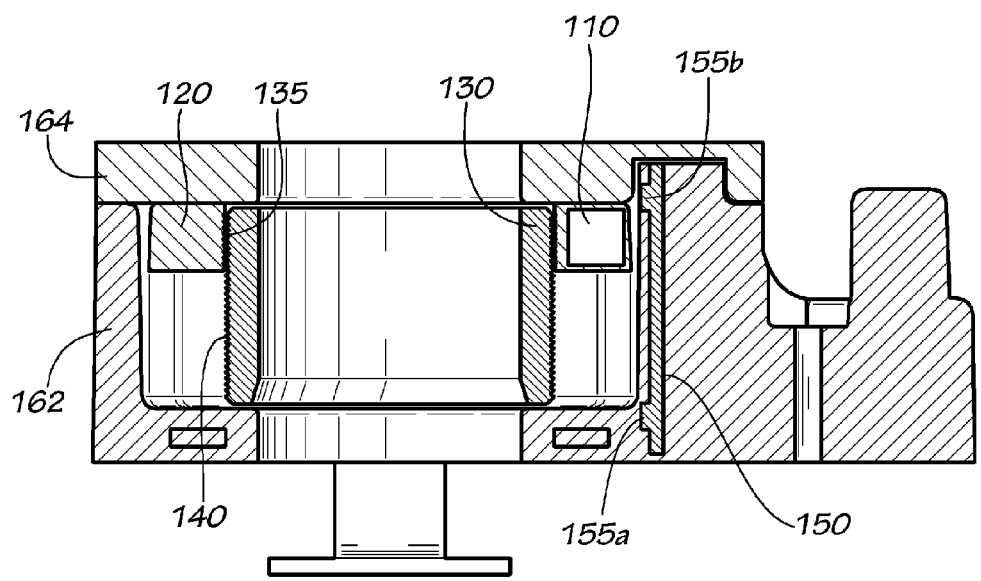
FIG. 5A is a cross-sectional view of the position indicator of FIG. 3 incorporated into the non-rising stem gate valve of FIG. 4 in an open state in accord with one embodiment of the disclosure.
Figure 5B:
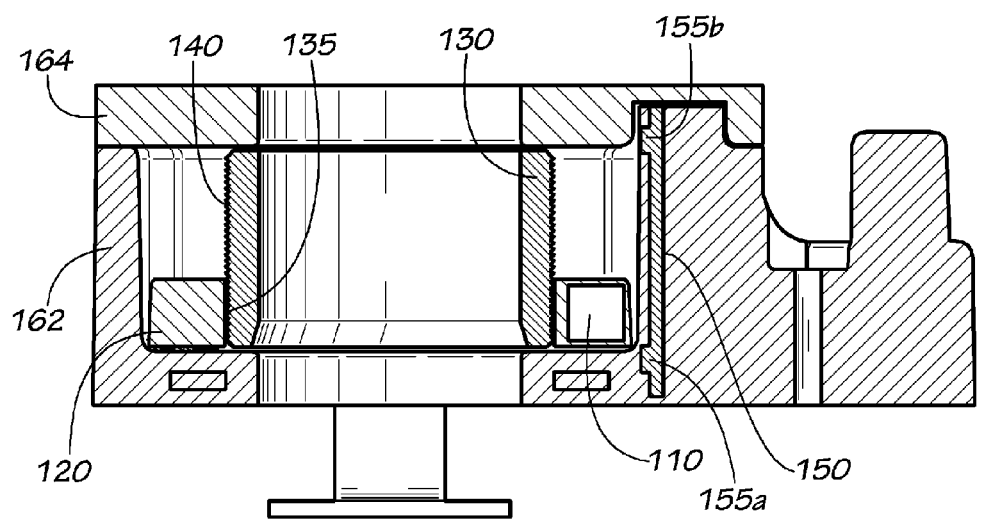
FIG. 5B is a cross-sectional view of the position indicator of FIG. 3 incorporated into the non-rising stem gate valve of FIG. 4 in a closed state in accord with one embodiment of the disclosure.

Turning to FIGS. 5A and 5B, the magnet 110 of the current embodiment is in proximity to the circuit board 150. The circuit board 150 has at least one Hall sensor included as part of its circuitry. In the current embodiment, Hall sensors 155a,b are shown. The Hall sensors 155a,b monitor the position of the magnet 110. In the current embodiment, the position of the magnet 110 can be determined reliably when the magnet is within one inch of each Hall sensors 155a,b. However, in various embodiments, the size of the magnet and the sensitivity of the supporting circuitry may allow a wider distance. Additionally, in various embodiments, one or multiple Hall sensors like Hall sensors 155a,b may be used to provide redundant or combination sensing. The circuit board 150 may include more than one Hall sensor 155 or may include various types of position sensors, including light sensors (e.g. light sources and sensors are strategically placed within the valve), mechanical position sensors (illustrated in FIGS. 6 and 7), and audio sensors (e.g. audio sources emit an audible or non-audible signal and audio sensors, such as hydrophones, microphones and the like, listen and determine the position of the gate by sound, frequency and/or time), among others. Moreover, the position indicator 100 may communicate the position to a variety of other devices or to a human. The use of the Hall effect and Hall effect sensors are well known in the art for use as proximity detectors. Additionally information may be obtained at http://en.wikipedia.org/wiki/Hall_effect_sensor, which is incorporated herein by reference.

Returning to FIG. 4, the non-rising stem gate valve 1000 may include one or more communication elements, including visual indicators, audible indicators, and/or communication devices. Examples of visual indicators include single or multiple lighted devices, LEDs, LCDs, dot matrix screens, or possibly cell phones or other similar communication devices as visual indicators. Audible indicators may include speakers and other audio devices. A communication device (further discussed in reference to FIGS. 12 and 13) such as a handheld position display, a cellular communication box, or a radio communication module, radio transceiver and transmitter, satellite transceiver and transmitter, cellular transceiver and transmitter, which may communicate via a wireless network, Bluetooth protocol, infra-red communication, or direct wired communication may also be incorporated in various embodiments of the gate valve 1000 or the position indicator 100. In various embodiments, the communication device or devices may interface with computers, the internet, other computer networking devices, or other electronic devices and software such as PDAs, smartphones, tablet computers, apps and computer applications, and networking software, among others.

The communication device may indicate, transmit, and/or interpret the position of the magnet 110 and, thereby, the state of the gate valve 1000. The communication device may be an integral part of the position indicator 1000 in various embodiments. For other examples, the position indicator 100 is separate from the communication device and connected either wirelessly or by wire. Power to the position indicator 100 and communication device may be provided by (to either or both devices) by battery, wire line, solar, generators, wind energy, hydro-electrical, thermo-electrical or another power source. The non-rising stem gate valve 1000 may also include a remote actuation device to provide remote control of the non-rising stem gate valve 1000 to remotely change it from an open state to a closed state (and vice versa) or some state in between. Such remote actuation may include AC motor driven, DC motor driven, or using a compressed air or hydraulic charge system, among other embodiments.

The position indicator 100 can be incorporated into the non-rising stem gate valve 1000 in various ways. In one embodiment, the position indicator 100 is an integral part of the non-rising stem gate valve 1000; in another embodiment, the position indicator 100 is an attachable/detachable assembly or part.

Optional sensors or other electrical hardware may be interfaced with the position indicator 100 to function in many capacities. Security features, pressure sensors and switches, temperature sensors, emergency shut-offs, flow velocity sensors, and chemical sensors, among other hardware, may each interface with the position indicator 100, the non-rising stem gate valve 1000, and/or any communication device included therewith. Moreover, the position indicator 100 and/or the non-rising stem gate valve 1000 may act as a repeater for wireless communications if needed in a network.

One of skill in the art would understand that other similar methods of tracking motion of the stem and/or the gate are included within this disclosure. For example, among other embodiments, the position indicator 100 could track rotational motion of the stem and use the rotational travel of the stem to calculate, based on thread size and pitch of the stem, the travel of the gate.

Figure 7:
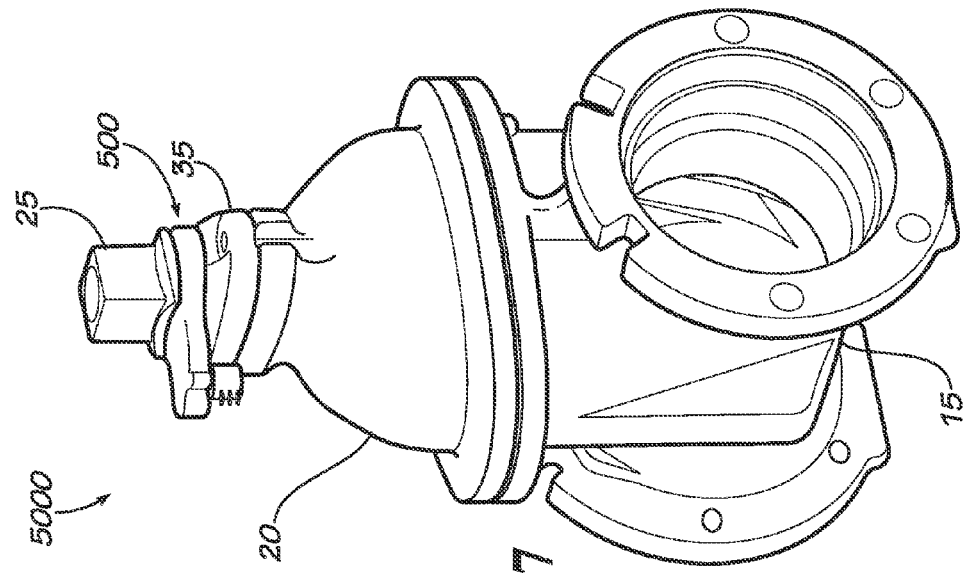
FIG. 7 is a perspective view of a non-rising stem gate valve incorporating the position indicator of FIG. 6 in accord with one embodiment of the disclosure.
Figure 6:
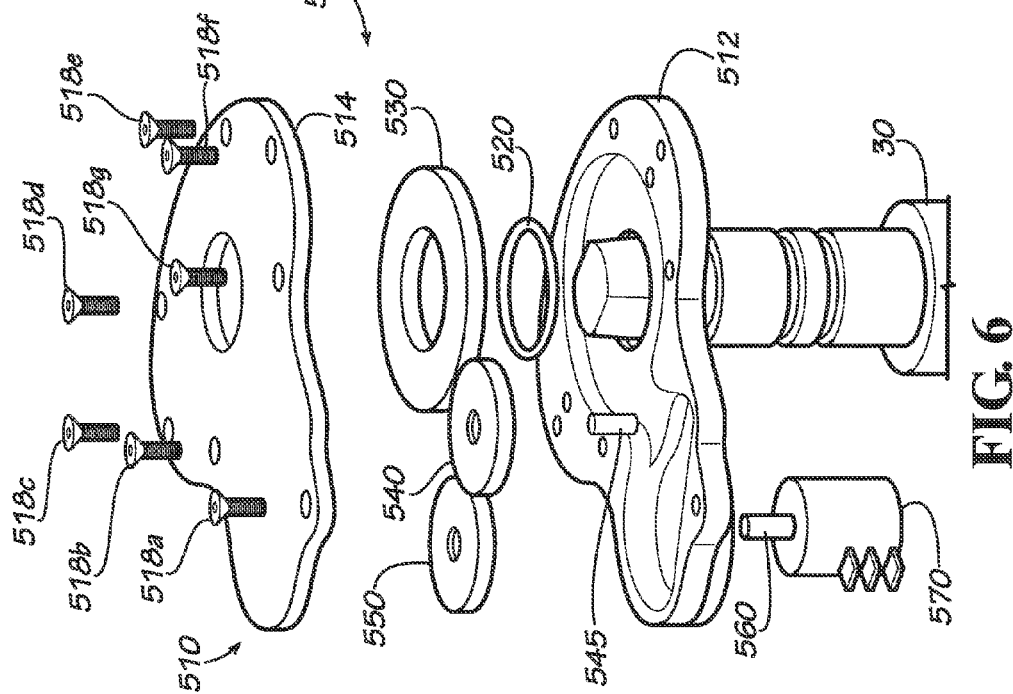
FIG. 6 is an exploded perspective view of a position indicator in accord with one embodiment of the current disclosure.

Another embodiment of a position indicator 500 is shown in a non-rising stem gate valve 5000 in FIGS. 6 and 7. The position indicator 500 of the current embodiment does not include magnets or Hall sensors as previously described. The position indicator 500 of the current embodiment utilizes measurement of the mechanical rotation of the stem 30 to determine the translational movement of the gate 40.

The position indicator 500, illustrated in FIG. 6, of the current embodiment includes a gear box to capture rotational movement. The stem 30 of the current embodiment is the same stem 30 utilized in the traditional non-rising stem gate valve 10 and is unmodified for the current embodiment. The position indicator 500 includes a gear enclosure 510 that includes a bottom 512 and a top 514. The top 514 of the gear enclosure 510 is connected to the bottom 512 of the gear enclosure using screws 518a,b,c,d,e,f,g, although various embodiments may include various fasteners and fastening methods.

An o-ring 520 is included and fitted around the stem 30 to connect the stem 30 to a ring gear 530. The o-ring 520 is placed between the ring gear 530 and the stem 30 to provide friction between the ring gear 530 and the stem 30 so that the ring gear 530 can be mechanically coupled to the stem 30 without modifying the stem 30. However, other mechanical connections may be utilized in various embodiments.

The ring gear 530 is arranged in engagement with an intermediate gear 540. The intermediate gears 540 is arranged to rotate around an intermediate gear shaft 545 that is connected to the gear enclosure 510. The intermediate gear 540 provides a mechanical correlation between rotation of the ring gear 530 and rotation of a potentiometer gear 550 that is arranged in engagement with the intermediate gear 540. The potentiometer gear 550 is fixedly connected to a potentiometer shaft 560 of a potentiometer 570. As such, the position indicator 500 provides a mechanical correlation between rotation of the stem 30 and rotation of the potentiometer shaft 560. The output resistance of the potentiometer 570 varies with the rotation of the potentiometer shaft 560. This variation can be correlated to the position of the gate in the non-rising stem valve. The rotation of the stem 30 can be calculated based on the gear ratio of the potentiometer shaft 560, the intermediate gear 550, the ring gear 540, and the stem 30. Vertical movement of the gate 40 can be determined from rotation of the stem 30 by a calculation involving pitch of the threads 39 of the stem 30. As such, the position indicator 500 of the current embodiment may provide a mechanical means of measuring rotation of the stem 30 from which the travel of the gate 40 can be determined Although the FIG. 6 does not explicitly show teeth, the ring gear 530, intermediate gear 540, and potentiometer gear 550 include an interface between each other that may include teeth, frictional surfaces, magnetic pole interaction, or another system to allow motion of the stem 30 to correspond with motion of the potentiometer shaft 560.

In various embodiments, other mechanical systems may provide similar value to the system described above. For example, in some systems, a DC motor, stepper motor, and/or various encoders, such as encoders that count the number of turns of the stem, may be implemented in an embodiment similar to the embodiment of FIG. 6. One of skill in the art would understand that various modifications to the embodiments of the current disclosure do not depart from general teachings of the disclosure, and various accommodations must be made to permit variance amongst the various embodiments.

FIG. 7 shows a non-rising stem gate valve 5000 of the current embodiment. The position indicator 500 of the current embodiment can be seen on the gate valve 5000.

In some embodiments of each position indicator 100,500 (and position indicator 600, shown below with reference to FIGS. 9-11D), the position indicator 100,500,600 may be attached to a valve such as non-rising stem gate valve 10 through retrofitting. Some existing valves are buried several feet underground, so retrofitting may be accomplished in some embodiments via a long arm to remove and replace various elements of a valve with new elements integrated with any of position indicators 100,500,600. Retrofitting existing valves would not require new gears, actuators, or other components in some embodiments, and the existing valves would continue to operate normally. In some embodiments of each position indicator 100,500,600, the position indicator 100,500,600 may be provided with the valves such as non-rising stem gate valves 1000,5000 (and gate valves 6000, shown below with reference to FIGS. 9-11D) respectively, in a preassembled package. Various other embodiments are considered within the disclosure as well, including, among others, integrating the position indicator with the stuffing box 35, installing along the stem 30 by removing the op nut 25, and providing a separate package that connects onto the bonnet 20 or the housing 15.

Other exemplary embodiments of a monitoring method and apparatus of the current disclosure include an optical sensor or an infrared sensor. In this embodiment, a light source, e.g. one or more light emitting diodes (LEDs), may be placed on the housing 15 on one side of the gate 40 and a light detecting sensor may be placed on the opposite side of the housing 15 and gate 40 inside the housing 15. Such a system would allow detection of opening or closing of the gate 40 and any valve into which such system was incorporated by detecting whether light is passing from one side of the gate 40 to the other. For example, one embodiment of the current disclosure may include three sets of LEDs and corresponding light detecting sensors, each set of LEDs and sensors may be spaced, on a vertical axis, equally throughout non-rising stem gate valve housing 15 (i.e. top, middle, bottom). As the gate 40 travels from an open to a closed position, the gate 40 will pass and block the light as it travels. Depending on the light blocked, the position indicator may translate such blockage into position or status of gate 40. In some embodiments, light sensing could be provided by light intensity to determine the percentage of gate opening.

Another exemplary embodiment includes an audio source and an audio sensor in a valve. The audio source may produce an audible or non-audible signal (i.e. a "ping") and the audio sensor (e.g. a hydrophone, an accelerometer, or microphone) listens and determines the characteristics of the ping by sound, frequency, time, amplitude, phase shifting, and other characteristics that correlates into the position or state of the valve. Such an embodiment would operate in a nature similar to SONAR.

Another exemplary embodiment includes toggle switching to indicate whether a gate valve is open or closed. A toggling embodiment can take multiple forms, including those described elsewhere in this disclosure when reconfigured to provide open/closed indication rather than percentage indication. In other embodiments, the position indicator may include an electrical contact on the end of the gate 40 and on the inside of the housing 15 such that a short is made when the gate 40 is closed and contacts the inside of the housing 15 and an open is formed when the gate 40 is raised. In other embodiments, mechanical switching in contact with the gate 40 or other components of the system may provide benefit in creating an open/closed indication.

Figure 8:
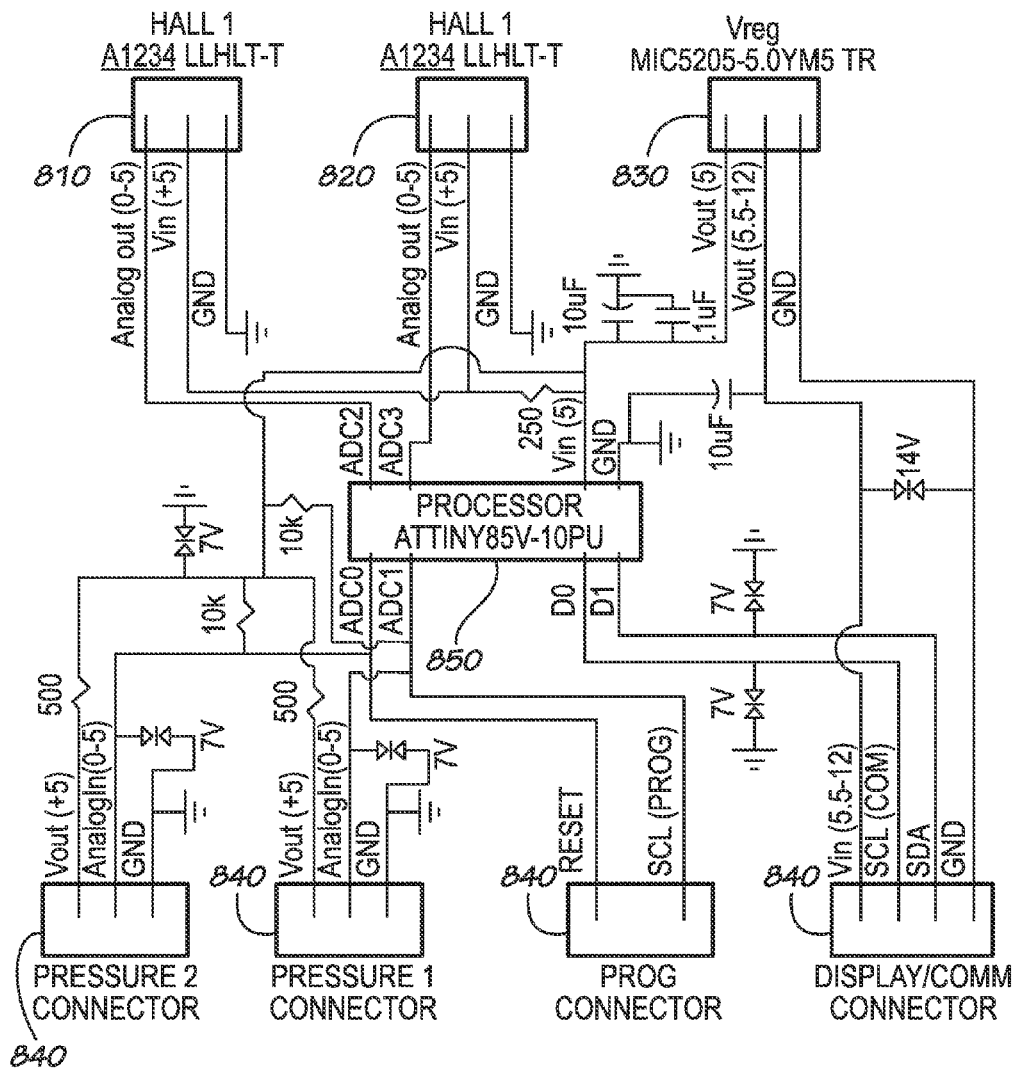
FIG. 8 is an electrical schematic of a position indicator circuitry in accord with one embodiment of the current disclosure.

An exemplary embodiment of a monitoring circuit of the current disclosure is illustrated in FIG. 8. The monitoring circuit 800 may be present on circuit board 150 of the current embodiment. The monitoring circuit 800 includes a microprocessor 850, a first Hall sensor 810, a second Hall sensor 820, a voltage source 830, multiple connectors 840 and various other components (e.g. capacitors, resistors and diodes), which components are ancillary to the design of the monitoring circuit 800 and use of such components are well known in the art. In the current embodiment, circuit board 150 may be placed in a vertical orientation so that Hall sensor 810 is directly below Hall sensor 820 on a vertical axis. In a closed state, gate 40 and magnet 110 are closer in proximity to Hall sensor 810, and magnet 110 produces a stronger magnetic field sensed by Hall sensor 810 relative to the magnetic field sensed by Hall sensor 820. Hall sensor 810 produces and transmits a signal to microprocessor 850 indicating the presence of a strong magnetic field. Microprocessor 850 interprets this signal and correlates the signal to the position of gate 40. Because the location of the gate 40 and magnet 110 is farther from the Hall sensor 820, Hall sensor 820 provides microprocessor 850 with a signal indicating little or no magnetic field. The signal from Hall sensor 820 confirms the location of the gate 40. Conversely, if the gate 40 and magnet 110 are in an open position and close in proximity to Hall sensor 820, the microprocessor 850 will interpret the signals from Hall sensors 810, 820 as the non-rising stem gate valve 1000 being open. Similarly, if gate 40 and magnet 110 are in an intermediate state or position, i.e. not fully open or closed, the Hall sensors 810, 820 will produce signals indicating such state/position.

Microprocessor 850 may also receive signals from other internal and external devices with which it may be interfacing via connectors 840. Connectors 840 may provide connection to or communication with various other sensors, displays, diagnostic tools, communication devices, and the like. The monitoring circuit 800 may communicate via analog or digital methods, wirelessly or wired, to any of various devices, which may be mounted with the non-rising stem gate valve 1000 or in another location desired. Although the current embodiment includes microprocessor 850, microprocessor 850 is not necessary, and its function may be implemented in hardware.

Although the exemplary embodiment of the monitoring circuit described with relation to FIG. 8 includes Hall sensors 810,820, one of skill in art would understand that various embodiments may require modification from the embodiment shown. For example, replacing the Hall sensors 810,820 with a potentiometer (such as shown with the embodiment of FIG. 6), related biasing circuitry and related software in the microprocessor would enable one of skill in the art to alter the circuitry as shown for other embodiments disclosed herein.

Figure 9:
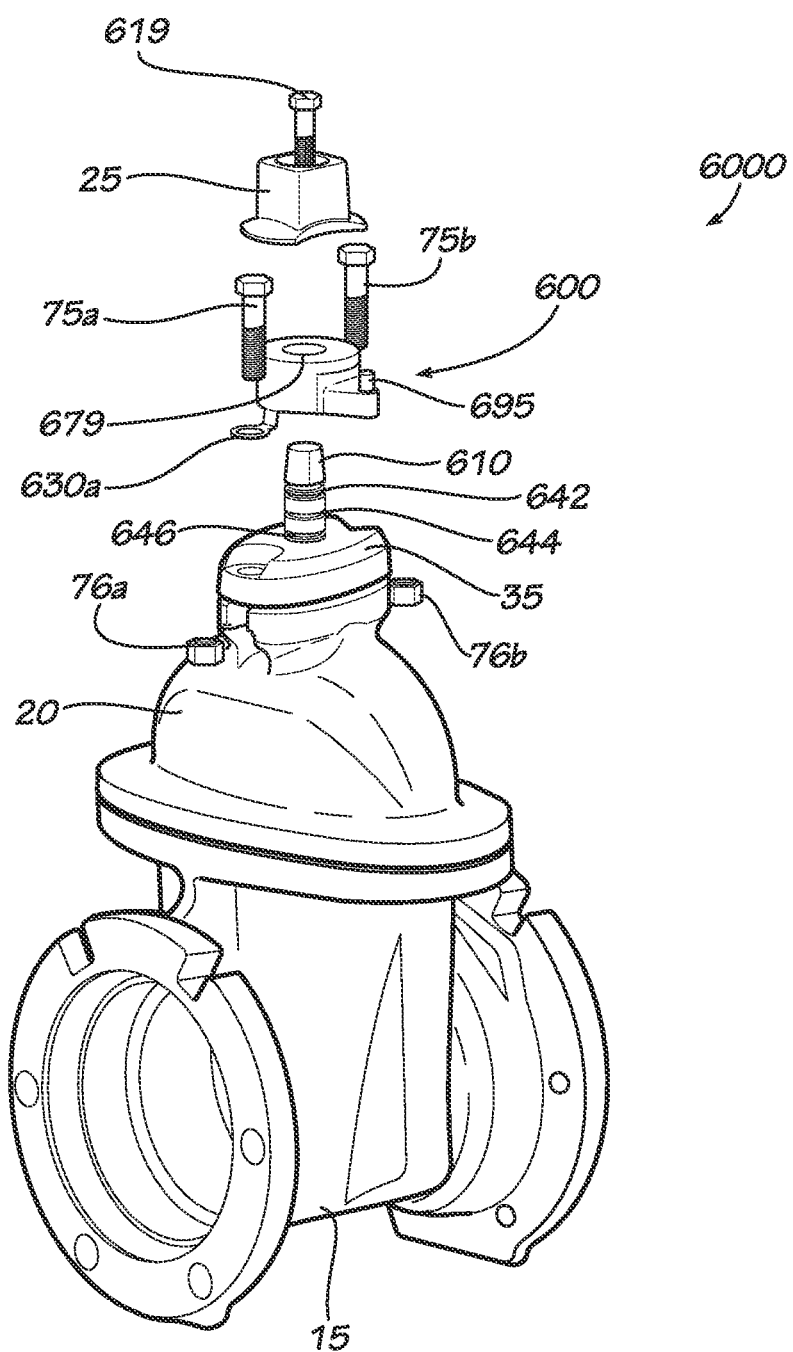
FIG. 9 is an exploded perspective view of a non-rising stem gate valve incorporating a position indicator in accord with one embodiment of the current disclosure.
Figure 10:
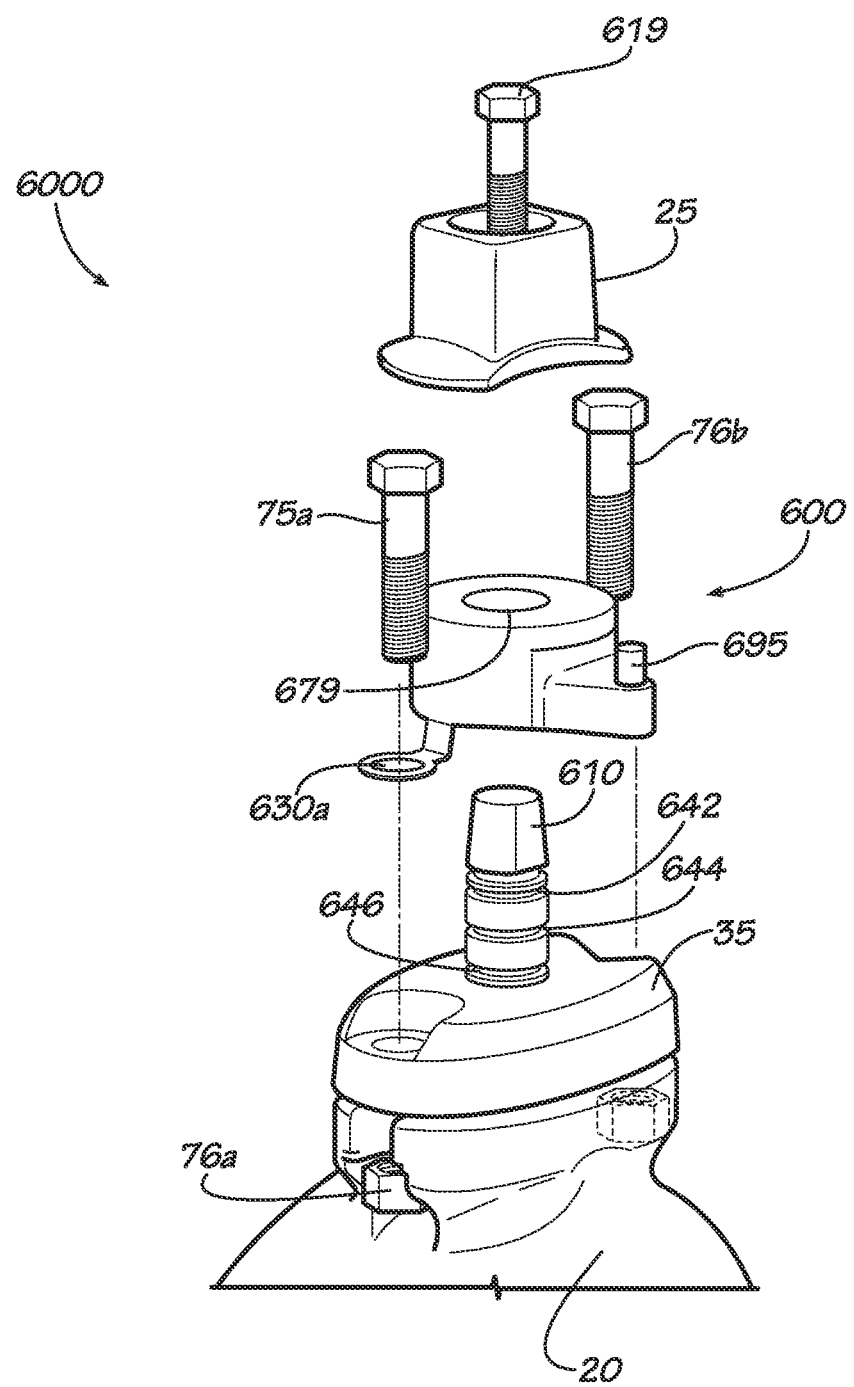
FIG. 10 is a close-up of the exploded perspective view of FIG. 9 in accord with one embodiment of the current disclosure.

Another embodiment of a position indicator 600 and gate valve 6000 is seen in FIGS. 9-11D. FIGS. 9-10 display an exploded view of the gate valve 6000 and a close-up exploded view of the position indicator 600 in assembly with other features of the gate valve 6000. The gate valve 6000 includes a stem 610, the position indicator 600, the stuffing box 35, bolts 75a,b, nuts 76a,b, the bonnet 20, the housing 15, the op nut 25, and an op nut bolt 619. FIG. 10 displays a close-up view of the gate valve 6000 of FIG. 9. As seen, the position indicator 600 has two keys 630a,630b (630b seen in FIGS. 11A-11C) which each accept one of the bolts 75a,b to keep the position indicator 600 aligned without rotating. The stem 610 includes o-ring channels 642,644,646 that accept o-rings (not shown) to provide friction for the position indicator 600 to be slipped over the stem 610 as will be discussed later. A connection post 695 is seen for connection of a wire if necessary. The position indicator 600 includes a stem aperture 679.

Figure 11A:
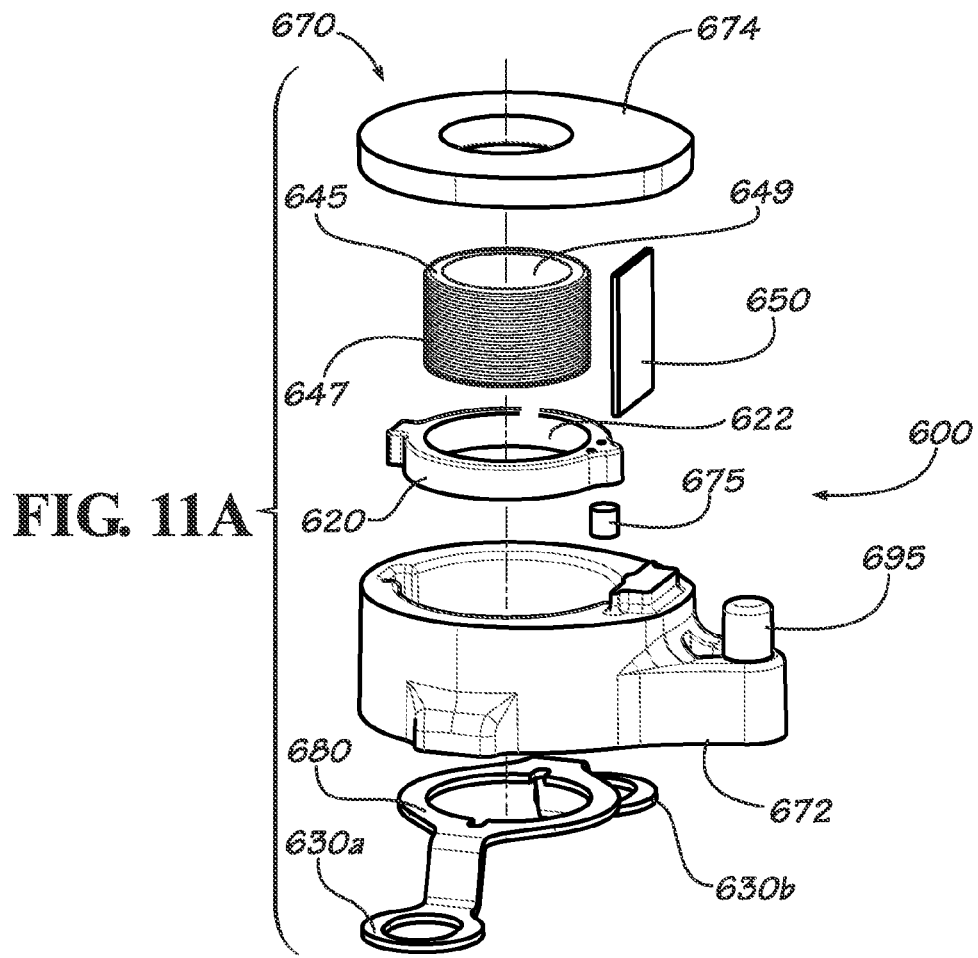
FIG. 11A is an exploded perspective view of the position indicator of FIG. 9 in accord with one embodiment of the current disclosure.

FIG. 11A displays an exploded view of the position indicator 600. The position indicator 600 includes a stem collar 645 that includes threading 647 on an outer surface. The stem collar 645 is fit over the stem 610 with o-rings (not shown) along its inner surface 649 so that the stem collar 645, having friction with the stem 610, engages the stem 610 and rotates therewith. A circuit board 650 is seen and is similar to circuit board 150 as previously described. A position couple 620 is seen that includes threading 622 on an inner surface. A case enclosure 670 includes a bottom 672 and a top 674. A magnet 675 is seen. The magnet 675 is placed inside or connected to the position couple 620. A positioning clip 680 is seen proximate a lower end of the position indicator 600. The position clip 680 includes keys 630a,b to engage the bolts 75a,b of the gate valve 600. The connection post 695 is also seen.

Figure 11B:
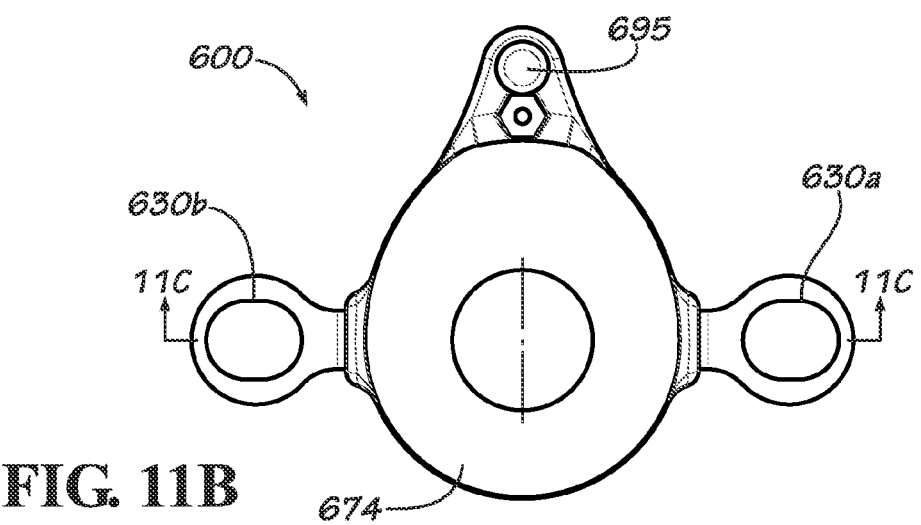
FIG. 11B is a top view of the position indicator of FIG. 9 in accord with one embodiment of the current disclosure.
Figure 11C:
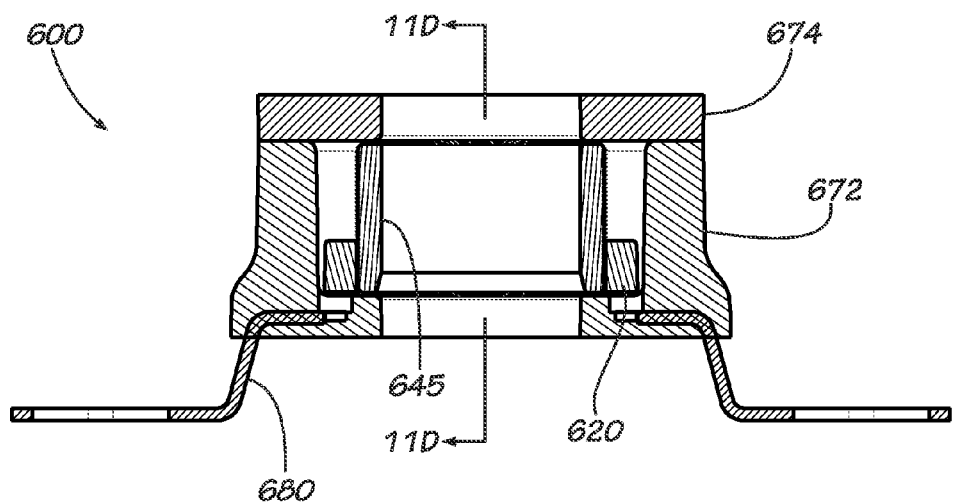
FIG. 11C is a cross-sectional view of the position indicator of FIG. 9 taken in the plane indicated by line A-A in FIG. 11B in accord with one embodiment of the current disclosure.
Figure 11D:
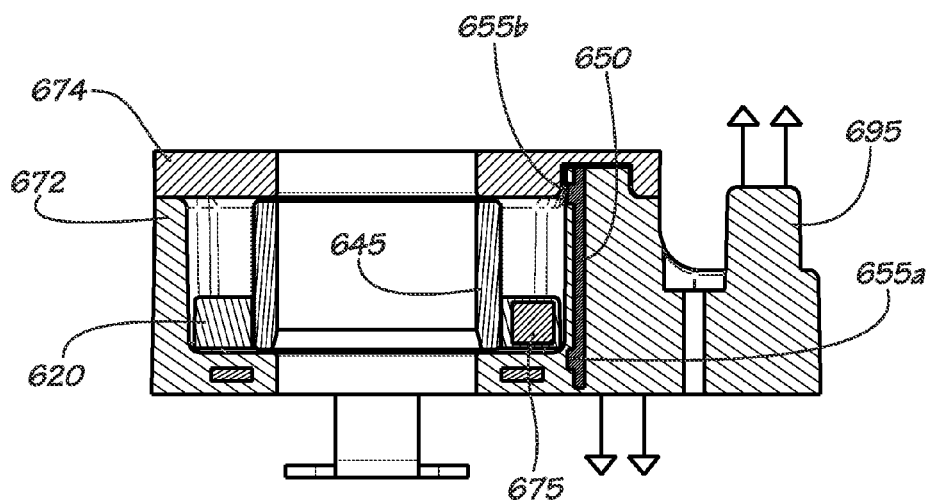
FIG. 11D is a cross-sectional view of the position indicator of FIG. 9 taken in the plane indicated by line B-B in FIG. 11C in accord with one embodiment of the current disclosure.

FIG. 11B displays a top view of the position indicator 600. As can be seen, the position indicator 600 includes two keys 630a,630b to accept the bolts 75a,b. FIG. 11C shows a cross-sectional view of the position indicator 600. The position couple 620 is seen with its threading 622 engaging the threading 647 on the stem collar 645. FIG. 11D shows another cross-sectional view of the position indicator 600. The magnet 675 can be seen inside the position couple 620. The circuit board 650 includes Hall sensors 655a,b. In connection with the stem, the stem collar 645 is attached to the stem 610 using o-rings (not shown) that provide friction with the stem 610. The connection post 695 is seen as well.

In operation, the stem 610 is coupled to the stem collar 645 via o-rings (not shown) so that the stem collar 645 rotates with the stem 610. Threading 647 of the stem collar 645 engages threading 622 of the position couple 620 to cause the position couple 620 to move vertically with the rotation of the stem 610. As discussed elsewhere in this disclosure, vertical motion of the position couple 620 corresponds with vertical motion of the magnet 675, which is sensed by Hall sensors 655a,b.

Figure 12:
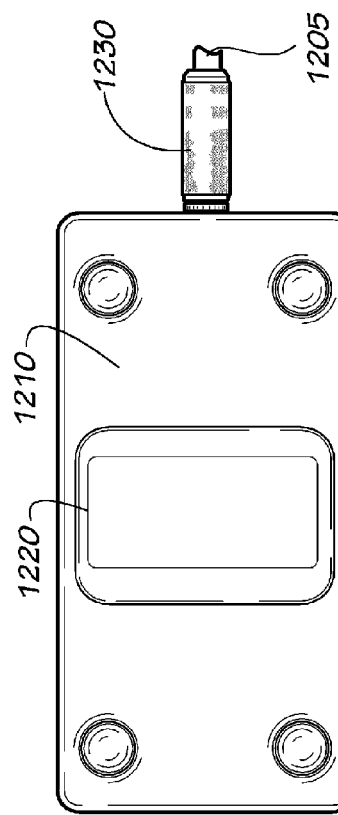
FIG. 12 is a view of a communication device in accord with one embodiment of the current disclosure.
Figure 13:
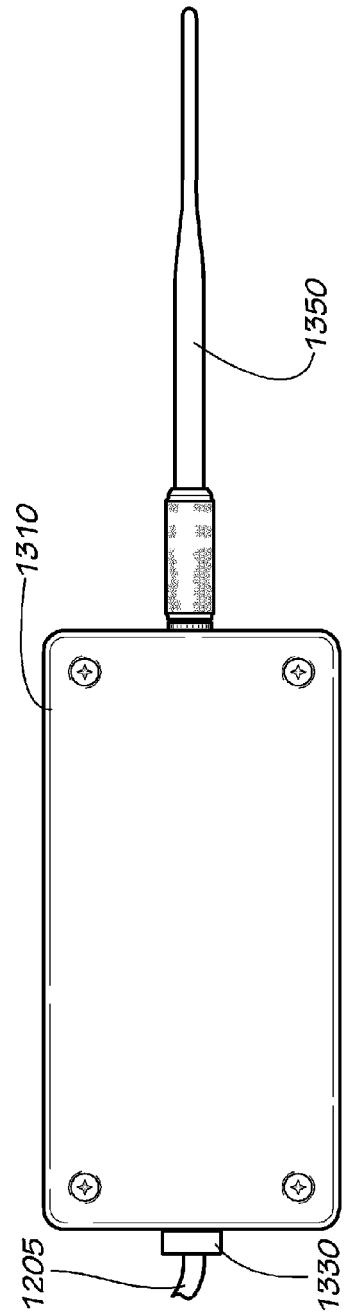
FIG. 13 is a view of a communication device in accord with one embodiment of the current disclosure.

As seen with reference to FIGS. 12 and 13, the position indicator 100,500,600 may be connected to a communication device. With reference to FIG. 12, communication device 1210 provides a visual readout of the state of the non-rising stem gate valve 1000,5000,6000. A wire conductor 1205 is connected on one end to the position indicator 100,500,600 via one of the connectors 840 (see FIG. 8) and on the other end to the communication device 1210 via connector 1230. The communication device 1210 has a screen 1220 that provides a readable display. The communication device 1210 may include circuitry or other electronics to interpret the signals it receives from the position indicator 100, 500. In other embodiments, the screen 1220 may display information provided by microprocessor 850 (see FIG. 8), Although a wire conductor 1205 is included in the current embodiment, the communication device 1210 may be connected wirelessly to the position indicator 100, 500.

With reference to FIG. 13, communication device 1310 is connected to the position indicator 100,500,600 by a wire conductor 1205 via connector 1330. The communication device 1310 includes an antenna 1350. In the current embodiment, the antenna 1350 may be mounted above ground level or just below ground level. In various embodiments, various antennas may be used that may be mounted in various spatial relationships with the ground and/or with the position indicator 100,500,600. Various embodiments may or may not include antennas that protrude from the communication device 1310. Although the communication device 1310 does not include a readable display such as the screen 1220 of the communication device 1210, in various embodiments, various communication devices may include both screens and wireless communication capability. Communication device 1310 may communicate the data and information received from position indicator 100, 500 to local or remote devices via one or more ways including cellular, Bluetooth, and WIFI communication methods.

Figure 14:
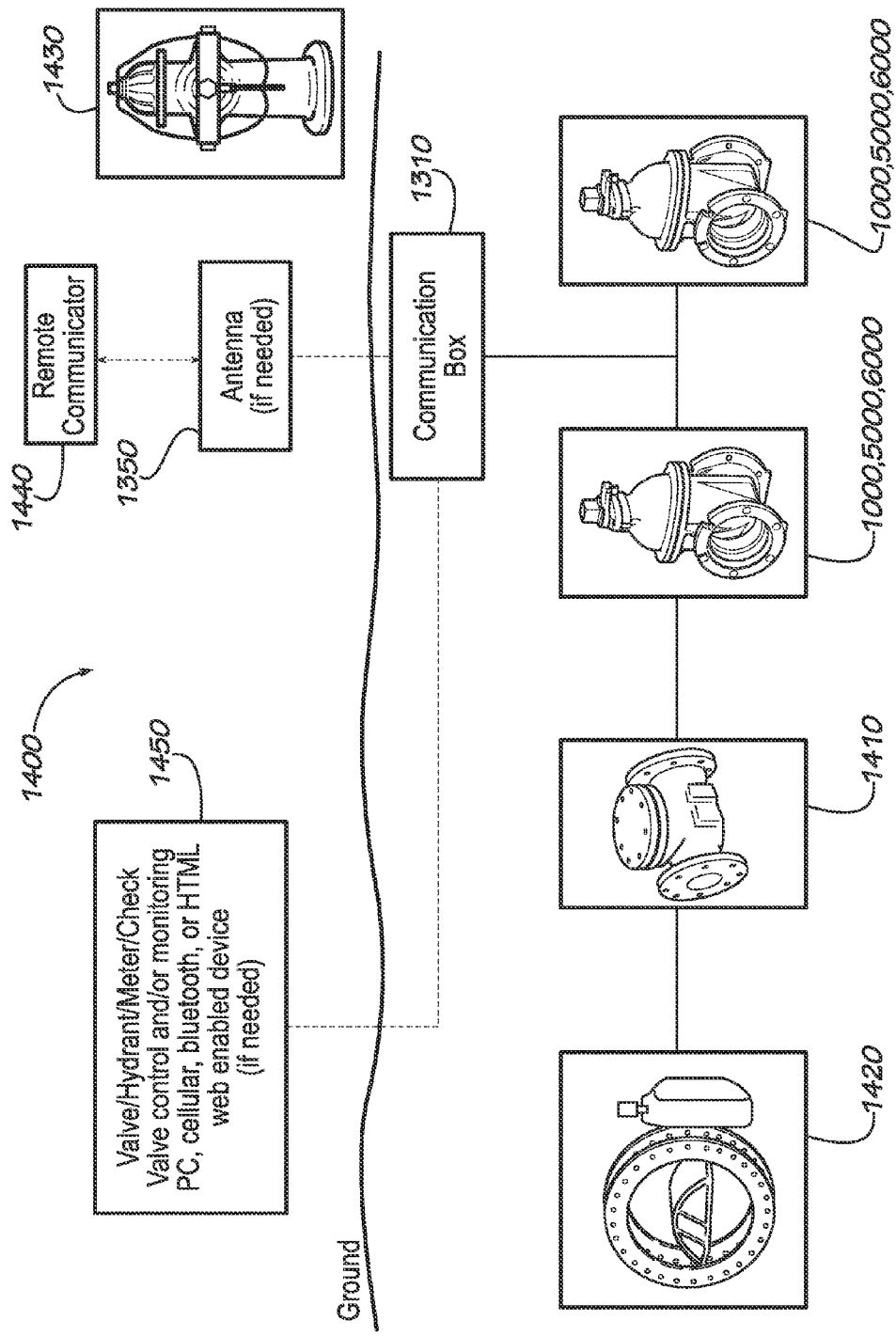
FIG. 14 is a block diagram of a system in accord with one embodiment of the current disclosure.

As seen in FIG. 14, a system 1400 of the current disclosure as applied to a residential water supply may include various components. Non-rising stem gate valves 1000, 5000,6000 may be connected in the system 1400 along with various valves such as check valve 1410 and butterfly valve 1420. The system 1400 may include a fire hydrant 1430. The various components of the system 1400 may include their own position indicators that may be similar in components or features to position indicators 100,500. The components of the system 1400 may be connected together and in communication with the communication device 1310 (as shown) or with another device such as communication device 1210 (not shown) via a wired connection or through wireless communication. The communication device 1310, via antenna 1350 may be capable of communicating with a remotely located communicator 1440. The system 1400 may also be capable of interfacing with another system along a nodal network or through a monitoring device 1450 such as a PC, cellular, Bluetooth, or HTML web enabled device, among others.

Figure 15:
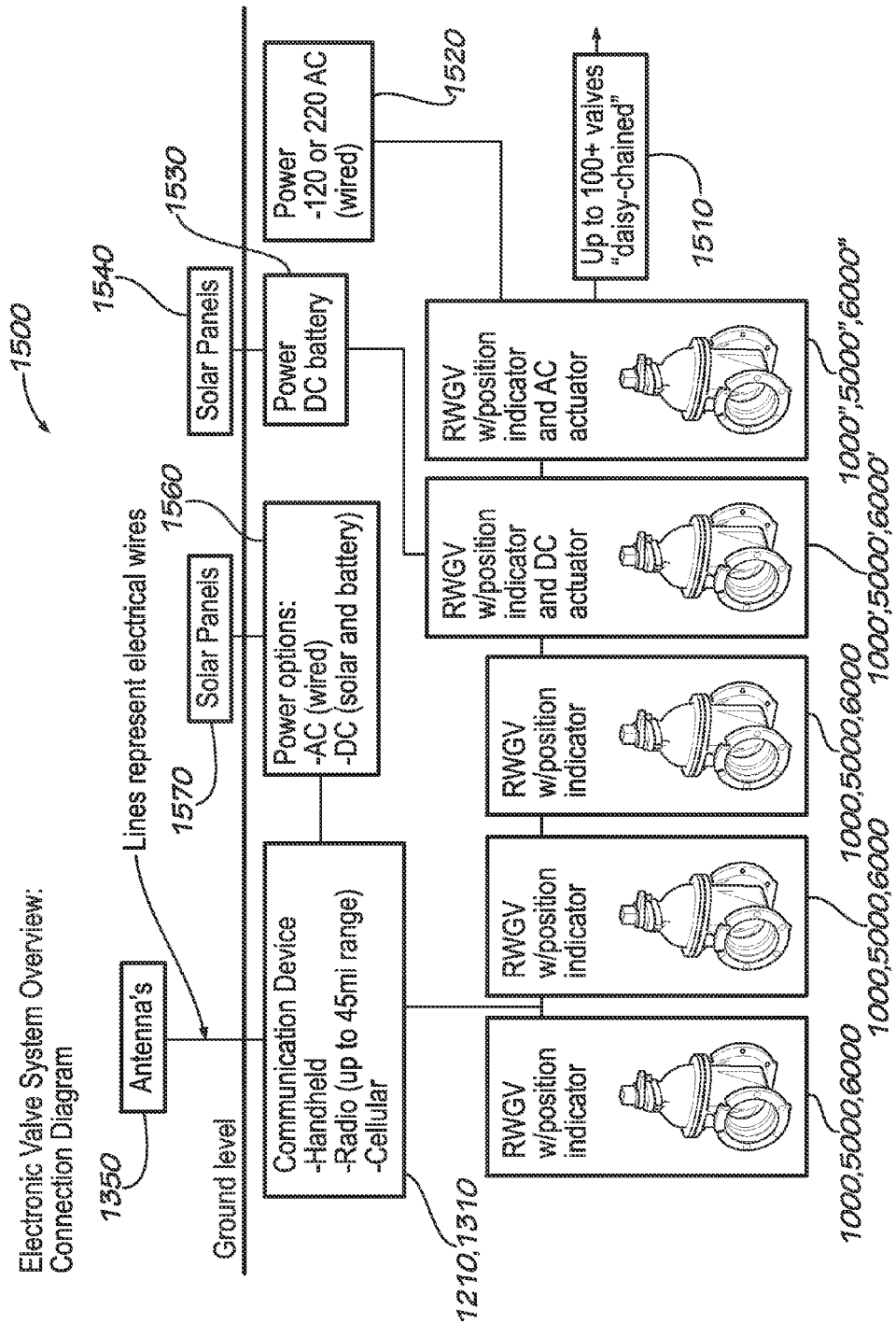
FIG. 15 is a block diagram of a system in accord with one embodiment of the current disclosure.

Another exemplary embodiment of a system embodying the current disclosure is system 1500 shown in FIG. 15. Various non-rising stem gate valves 1000,5000,6000 are connected in communication with each other as shown. Additionally, the system 1500 includes a non-rising stem gate valve 1000',5000', which includes a DC actuator (as discussed previously) and a non-rising stem gate valve 1000",5000", which includes an AC actuator (as discussed previously). Additional valves such as non-rising stem gate valves 1000,1000',1000",5000,5000',5000" may be connected or "daisy-chained" in the system 1500. A power source 1520 is shown as a 120V or 220V alternating current (AC) source to power the AC actuator of the non-rising stem gate valve 1000",5000". Another power source 1530 is shown as a direct current (DC) battery to power the DC actuator of the non-rising stem gate valve 1000',5000'. No single power source or power supply method should be considered limiting on the disclosure, and various power arrangements may be made for various components of the system 1500 or similar systems in accord with the current disclosure.

The DC power source 1530 in the current embodiment may be charged through solar energy of solar panels 1540. Other sources of power such as wind, water, heat, vibration, compressed air, and spring energy, among others, may be used in various embodiments and would be understood by one of skill in the art.

The "daisy-chain" of non-rising stem gate valves 1000, 1000',1000",5000,5000',5000" are connected to the communication devices 1210,1310. In the current embodiment, the communication devices 1210,1310, includes the antenna 1350, and communicate with a remotely located communicator (not shown). Power to the communication devices 1210, 1310 is supplied by the power source 1560, which may be AC or DC power and may be supplied by wire, solar, battery, or other method. Solar panels 1570 are shown connected to the power source 1560 and may be included to provide power.

Figure 16:
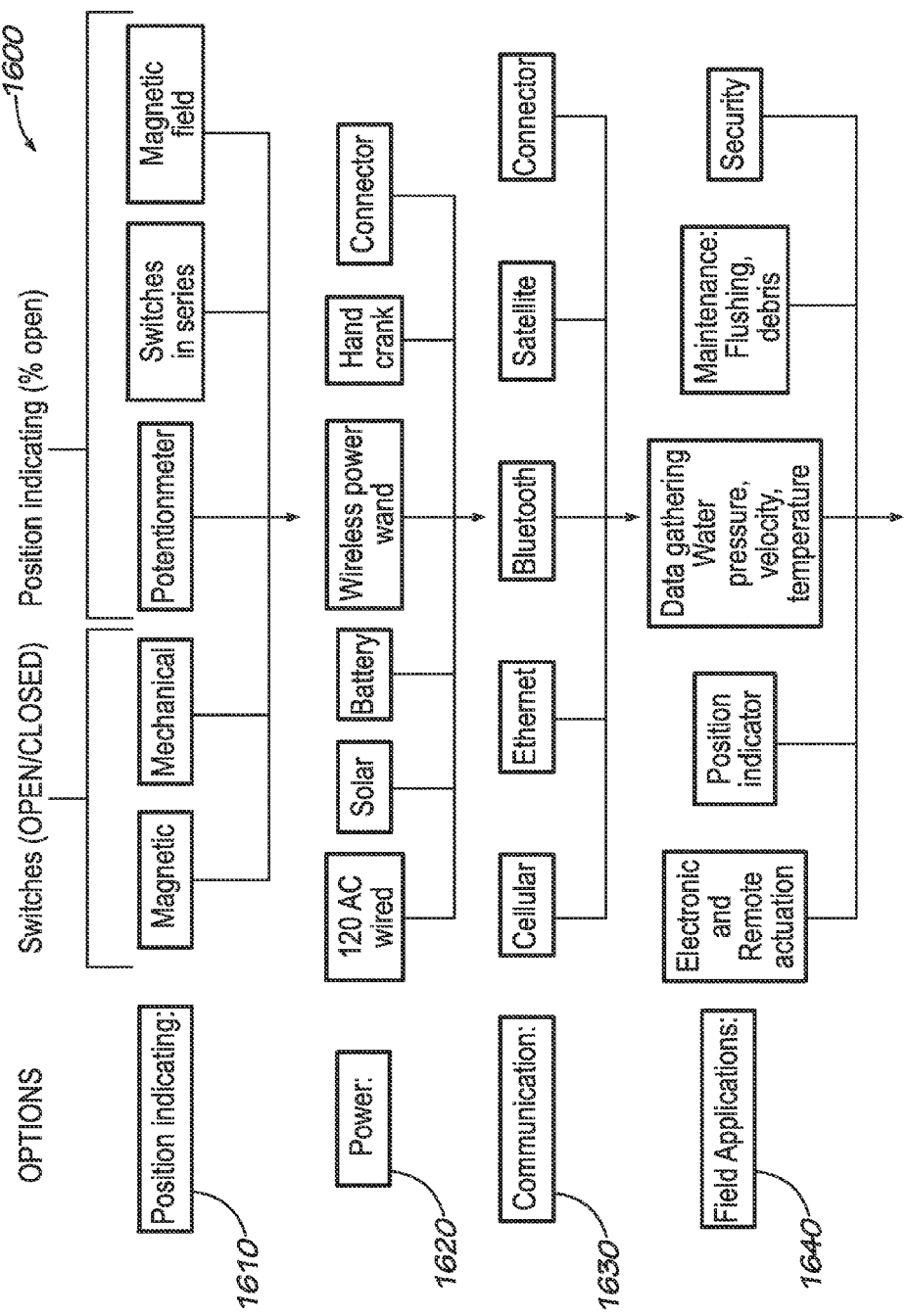
FIG. 16 is a block diagram showing various system components in accord with multiple embodiments of the current disclosure.

Illustrated in FIG. 16, system 1600 may include various combinations of components, processes, methods and apparatus. The combinations of components, processes, methods and apparatus as described with reference to FIG. 16 may be implemented in the systems 1400,1500 previously described or in various other implementations of the current disclosure. Position monitoring and indicating as shown in block 1610 may include magnetic, mechanical, potentiometer (such as potentiometer 570 included with position indicator 500), switches in series, or magnetic field (such as the magnetic field described in connection with position indicator 100) sensing, among others. Some magnetic or mechanical methods may display only an open or a closed state and may not provide exact position location; other approaches to position indicating (such as those previously described) may provide approximate position indication based on sensed or percentage data. The power source as shown by block 1620 may include a number of options including 120V or 220V AC power, solar, battery, wireless power wand, hand crank or other mechanical storing of potential energy, or through a connection of another power source. Communication methods as shown by block 1630 may include cellular, radio, ethernet, Bluetooth, satellite, or connection to another communication device. Field applications shown by block 1640 may include electronic and remote actuation; position indication; data gathering such as water pressure, temperature, turbidity, velocity, and other features of the system 1600; maintenance applications such as routine or emergency flushing; and, security applications such as tamper detection or hazardous material flushing.

Other components of the system 1500 may include various valves, meters, and hydrants, among others. Although the current embodiment is discussed in the context of non-rising gate valves 1000,1000',1000",5000,5000',5000", 6000,6000',6000", one of skill in the art would understand that multiple components of the system 1500 may include various position indicators and may be connected in the system.

In various embodiments, position indicators in accord with the present disclosure may be internal to the apparatus for which they provide position indication information. In various embodiments, position indicators in accord with the present disclosure may be integral with the apparatus for which they provide position indication information. Various embodiments of this disclosure may include various combinations and subcombinations of elements as disclosed herein may be over- or under-inclusive of the exemplary embodiments described in detail herein.

One should note that conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Unless stated otherwise, it should not be assumed that multiple features, embodiments, solutions, or elements address the same or related problems or needs. Thus, such conditional language is not generally intended to imply that features, elements, and/or steps are in any way required for one or more particular embodiments or that one or more particular embodiments necessarily include logic for deciding, with or without user input or prompting, whether these features, elements, and/or steps are included or are to be performed in any particular embodiment.

It should be emphasized that the above-described embodiments are merely possible examples of implementations, merely set forth for a clear understanding of the principles of the present disclosure. Any physical properties described above should be understood as representing one of many possible embodiments, and alternate implementations are included depending on the functionality involved, as would be understood by those reasonably skilled in the art of the present disclosure. Many variations and modifications may be made to the above-described embodiment(s) without departing substantially from the spirit and principles of the present disclosure. Further, the scope of the present disclosure is intended to cover any and all combinations and sub-combinations of all elements, features, and aspects discussed above. All such modifications and variations are intended to be included herein within the scope of the present disclosure, and all possible claims to individual aspects or combinations of elements or steps are intended to be supported by the present disclosure.

That which is claimed is:

1. A non-rising stem gate valve assembly, comprising:
   a valve housing configured to permit flow of fluid through the valve housing;
   a gate disposed within the valve housing;
   a valve stem defined by an elongated rod having a first external threading and a second external threading distal from the first external threading, the first external threading configured to engage the gate and to cause translational motion of the gate upon rotation of the valve stem;
   a position indicator, wherein the position indicator includes a monitoring element and a position couple engaging the valve, the position couple including a collar defining a bore with internal threading threadedly engaging the second external threading of the valve stem; and
   a communication element.

2. The assembly of claim 1, wherein the position indicator includes a magnet placed within the position couple.

3. The assembly of claim 1, wherein the position indicator includes at least one proximity sensor.

4. The assembly of claim 3, wherein the at least one proximity sensor is a first Hall sensor and a second Hall sensor, the first Hall sensor positionable relative to an open position of the valve and the second Hall sensor positionable relative to a closed position of the valve.

5. The assembly of claim 3, wherein the at least one proximity sensor is connected to a circuit board.

6. The assembly of claim 1, wherein the position indicator is mountable between a stuffing box of the valve and an op nut of the valve, the op nut rotationally fixed to the valve stem.

7. The assembly of claim 1, wherein the communication element includes a communication device.

8. The assembly of claim 7, wherein the communication device includes a visual readout.

9. The assembly of claim 7, wherein the communication device is connected to the position indicator by a wire conductor.

10. The assembly of claim 7, wherein the communication device includes an antenna.

11. A method for indicating the status of at least one non-rising stem gate valve, comprising:
   causing translational motion of a gate within a valve housing by rotating a valve stem defined by an elongated rod having a first external threading engaging the gate;
   monitoring positions of the gate along the valve with a position indicator including a position couple engageable with the valve, the position couple including a collar having a bore with internal threading threadedly engaging a second external threading of the valve stem disposed distal from the first external threading; and
   communicating the positions of the gate enclosed by the valve with a communications element.

12. The method of claim 11, wherein monitoring positions of a device enclosed by the first valve with a position indicator includes using at least one proximity sensor to determine the position of a magnet of the position indicator.

13. The method of claim 11, further comprising:
   monitoring positions of a second device enclosed by a second valve with a second position indicator;
   communicating the positions of the second device enclosed by the second valve with the communications element.

14. The method of claim 11, further comprising communicating the position of the device enclosed by the first valve with a remotely located communicator.

15. A non-rising stem gate valve assembly, comprising:
   a valve housing configured to permit flow of fluid through the valve housing;
   a gate disposed within the valve housing;
   a valve stem defined by an axially-fixed elongated rod having a first external threading and a second external threading distal from the first external threading, the first external threading configured to engage the gate and to cause translational motion of the gate upon rotation of the valve stem;
   a position indicator, wherein the position indicator includes a monitoring element and a position couple engaging the valve, the position couple including a collar defining a bore with internal threading threadedly engaging the second external threading of the valve stem, the collar being rotationally fixed and configured to translate along the second external threading of the valve stem upon rotation of the valve stem; and
   a communication element.

16. The assembly of claim 15, wherein the position indicator includes at least one proximity sensor.

17. The assembly of claim 16, wherein the at least one proximity sensor is a first Hall sensor and a second Hall sensor, the first Hall sensor positionable relative to an open position of the valve and the second Hall sensor positionable relative to a closed position of the valve.

18. The assembly of claim 16, wherein the at least one proximity sensor is connected to a circuit board.

19. The assembly of claim 15, wherein the position indicator is mountable between a stuffing box of the valve and an op nut of the valve, the op nut being rotationally fixed to the valve stem.

20. The assembly of claim 19, wherein the stuffing box further defines a bore, an external portion of the valve stem distal from the gate extending outwards through the bore of the stuffing box, the second external threading of the valve stem disposed on the external portion of the valve stem.

* * * * *